(12) United States Patent
Kobayashi et al.

(10) Patent No.: US 9,316,136 B2
(45) Date of Patent: Apr. 19, 2016

(54) ENGINE UNIT AND WORK VEHICLE

(71) Applicant: KOMATSU LTD., Tokyo (JP)

(72) Inventors: Tsuyoshi Kobayashi, Hirakata (JP);
Katsuhiro Tsutsumi, Hitachinaka (JP);
Hirofumi Miyamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/366,088

(22) PCT Filed: May 14, 2013

(86) PCT No.: PCT/JP2013/063365
§ 371 (c)(1),
(2) Date: Jun. 17, 2014

(87) PCT Pub. No.: WO2014/006977
PCT Pub. Date: Jan. 9, 2014

(65) Prior Publication Data
US 2015/0000256 A1  Jan. 1, 2015

(30) Foreign Application Priority Data

Jul. 5, 2012 (JP) ................. 2012-151163

(51) Int. Cl.
*F01N 3/24* (2006.01)
*F01N 3/20* (2006.01)
(Continued)

(52) U.S. Cl.
CPC ............... *F01N 3/206* (2013.01); *B60K 13/04* (2013.01); *E02F 9/0866* (2013.01); *F01N 3/021* (2013.01);
(Continued)

(58) Field of Classification Search
CPC ..... F01N 3/035; F01N 3/2066; F01N 13/009; F01N 13/011; F01N 13/1816; F01N 2250/02; F01N 2340/02; F01N 2340/04; F01N 2470/16; F01N 2470/18; F01N 2470/20; F01N 2490/06; F01N 2590/08; F01N 2610/02; F01N 2610/1406; F01N 2610/1453
USPC .................... 60/295, 296, 297, 301, 311, 322
See application file for complete search history.

(56) References Cited

U.S. PATENT DOCUMENTS

2008/0314033 A1* 12/2008 Aneja et al. ..................... 60/297
2010/0000203 A1    1/2010 Kowada
(Continued)

FOREIGN PATENT DOCUMENTS

| JP | S51-151824 U | 12/1976 |
|---|---|---|
| JP | H08-21234 A | 1/1996 |
| JP | H09-68034 A | 3/1997 |
| JP | 2008-031955 A | 2/2008 |
| JP | 2009-068415 A | 4/2009 |
| JP | 2009-103016 A | 5/2009 |

(Continued)

*Primary Examiner* — Thomas Denion
*Assistant Examiner* — Jorge Leon, Jr.
(74) *Attorney, Agent, or Firm* — Drinker Biddle & Reath LLP

(57) ABSTRACT

Two sets of assemblies are arranged such that a diesel particulate filter device of an assembly as a first set, a selective catalytic reduction device of the assembly as the first set, a selective catalytic reduction device of an assembly as a second set, and a diesel particulate filter device of the assembly as the second set are located next to each other in this order. Respective first and second connection pipes are routed through a region directly underneath an arrangement region where the two selective catalytic reduction devices and the like are arranged, and connected to the respective diesel particulate filter devices. Thereby, an engine unit and a work vehicle which facilitate connection between an engine and an exhaust gas treatment structure and can reduce a load on the first and second connection pipes due to vibration can be achieved.

14 Claims, 11 Drawing Sheets

(51) Int. Cl.
  *B60K 13/04* (2006.01)
  *E02F 9/08* (2006.01)
  *F01N 13/18* (2010.01)
  *F01N 13/00* (2010.01)
  *F01N 3/021* (2006.01)
  *F01N 3/10* (2006.01)
  *F01N 13/08* (2010.01)
  *F01N 3/28* (2006.01)
  *F01N 3/035* (2006.01)

(52) U.S. Cl.
  CPC ............ *F01N 3/10* (2013.01); *F01N 13/009* (2014.06); *F01N 13/011* (2014.06); *F01N 13/08* (2013.01); *F01N 13/1805* (2013.01); *F01N 13/1816* (2013.01); *F01N 13/1822* (2013.01); *B60Y 2200/412* (2013.01); *F01N 3/035* (2013.01); *F01N 3/2066* (2013.01); *F01N 3/2882* (2013.01); *F01N 2250/02* (2013.01); *F01N 2340/02* (2013.01); *F01N 2340/04* (2013.01); *F01N 2470/16* (2013.01); *F01N 2470/18* (2013.01); *F01N 2470/20* (2013.01); *F01N 2590/06* (2013.01); *F01N 2590/08* (2013.01); *F01N 2610/02* (2013.01); *F01N 2610/1406* (2013.01); *F01N 2610/1453* (2013.01); *Y02T 10/20* (2013.01)

(56) References Cited

U.S. PATENT DOCUMENTS

| | | | |
|---|---|---|---|
| 2010/0031644 A1* | 2/2010 | Keane et al. | 60/295 |
| 2010/0186381 A1* | 7/2010 | Charles et al. | 60/282 |
| 2010/0186394 A1* | 7/2010 | Harrison et al. | 60/299 |
| 2010/0218488 A1 | 9/2010 | Yokota | |
| 2011/0079003 A1* | 4/2011 | Sun et al. | 60/310 |
| 2011/0088376 A1* | 4/2011 | Kowada | 60/297 |
| 2011/0146252 A1* | 6/2011 | Silver et al. | 60/301 |
| 2011/0214416 A1 | 9/2011 | Kowada et al. | |
| 2012/0167558 A1* | 7/2012 | Svihla et al. | 60/323 |
| 2012/0222413 A1* | 9/2012 | Golin et al. | 60/311 |
| 2012/0247861 A1* | 10/2012 | Mizuno et al. | 180/296 |
| 2012/0273648 A1* | 11/2012 | Maske et al. | 248/636 |
| 2013/0067891 A1* | 3/2013 | Hittle et al. | 60/274 |
| 2013/0199160 A1 | 8/2013 | Kruer et al. | |
| 2013/0213726 A1 | 8/2013 | Okada | |
| 2013/0319787 A1* | 12/2013 | Kobayashi et al. | 180/309 |

FOREIGN PATENT DOCUMENTS

| | | |
|---|---|---|
| JP | 2010-038019 A | 2/2010 |
| JP | 2012-097413 A | 5/2012 |
| JP | 2012-117397 A | 6/2012 |
| WO | WO-2011/152306 A1 | 12/2011 |
| WO | WO 2012114801 A1 * | 8/2012 |

* cited by examiner

ENGINE UNIT AND WORK VEHICLE

TECHNICAL FIELD

The present invention relates to an engine unit and a work vehicle.

BACKGROUND ART

A work vehicle such as a hydraulic excavator, bulldozer, or a wheel loader is equipped with an exhaust gas treatment device. Examples of the exhaust gas treatment device include a diesel particulate filter (DPF) device, a diesel oxidation catalyst (DOC) device, and a selective catalytic reduction (SCR) device.

A work vehicle equipped with an exhaust gas treatment device is disclosed, for example, in Japanese Patent Laying-Open No. 2012-097413 (see PTD 1).

In this publication, a table is arranged above an upper frame with support legs interposed therebetween, and a first exhaust gas treatment device and a second exhaust gas treatment device constituting an exhaust gas treatment unit are arranged above the table. An engine and the first exhaust gas treatment device are connected by a connection pipe.

CITATION LIST

Patent Document

PTD 1: Japanese Patent Laying-Open No. 2012-097413

SUMMARY OF INVENTION

Technical Problem

In the above publication, the exhaust gas treatment unit is supported by supports such as the support legs and the table. Thus, a large load due to a difference in vibration between the engine and the supports acts on the connection pipe.

Here, a vehicle equipped with a large engine may have an insufficient exhaust gas treatment capability, and thus it is contemplated to provide such a vehicle with a plurality of exhaust gas treatment units in order to improve exhaust gas treatment capability. However, when a plurality of exhaust gas treatment units are provided, the number of connections between the first exhaust gas treatment devices and the connection pipes is increased, and the weight of the plurality of exhaust gas treatment units as a whole is also increased. Therefore, the above problem becomes more significant.

Further, even when the plurality of exhaust gas treatment units are supported on the engine, a large load is imposed on the connection pipes due to a heavy weight of the exhaust gas treatment units as a whole.

The present invention has been made in view of the above problem, and one object of the present invention is to provide an engine unit and a work vehicle capable of reducing a load on a connection pipe due to vibration.

Solution to Problem

An engine unit in accordance with the present invention includes an engine, a first exhaust gas treatment unit, a second exhaust gas treatment unit, a first connection pipe, and a second connection pipe. The first exhaust gas treatment unit is arranged above the engine, and includes a first exhaust gas treatment device and a second exhaust gas treatment device. The second exhaust gas treatment unit is arranged above the engine, and includes a third exhaust gas treatment device and a fourth exhaust gas treatment device. The first connection pipe has an expandable first bellows part, and guides exhaust gas from the engine to the first exhaust gas treatment device of the first exhaust gas treatment unit. The second connection pipe has an expandable second bellows part, and guides the exhaust gas from the engine to the third exhaust gas treatment device of the second exhaust gas treatment unit. The first to fourth exhaust gas treatment devices are arranged to be located in an order of the first exhaust gas treatment device, the second exhaust gas treatment device, the fourth exhaust gas treatment device, and the third exhaust gas treatment device, such that respective longitudinal directions thereof extend next to each other. The first connection pipe is routed through at least a partial region of a region directly underneath the second exhaust gas treatment device and a region directly underneath the fourth exhaust gas treatment device. The second connection pipe is routed through at least a partial region of the region directly underneath the second exhaust gas treatment device and the region directly underneath the fourth exhaust gas treatment device.

According to the engine unit in accordance with the present invention, since the first and second exhaust gas treatment units are provided, exhaust gas treatment capability can be improved, and a sufficient exhaust gas treatment capability can be obtained even for a vehicle equipped with a large engine.

Further, the respective first and second connection pipes are routed through at least a partial region of the region directly underneath the second exhaust gas treatment device and the region directly underneath the fourth exhaust gas treatment device. By routing the first and second connection pipes as described above, the first and second connection pipes can be ensured to have long lengths while being arranged under the first and second exhaust gas treatment units. Thus, even when there occurs an error in the positions of the engine and the first and second exhaust gas treatment units caused by an accuracy in processing and assembling a support supporting the first and second exhaust gas treatment units, and deflection of the support due to the weights of the first and second exhaust gas treatment units, the above error can be absorbed by the lengths of the connection pipes and the expandable first and second bellows parts. Therefore, also in the configuration provided with the first and second exhaust gas treatment units, connection between the engine and the first and second exhaust gas treatment units is facilitated.

Further, since the first and second connection pipes can be ensured to have long lengths, a vibration difference between the vibration of a frame and the vibration of the engine can be absorbed by the lengths of the connection pipes and the expandable first and second bellows parts. Therefore, also in the configuration provided with the first and second exhaust gas treatment units, a load due to the above vibration difference can be suppressed from acting on the first and second connection pipes.

Further, since the first and second connection pipes can be ensured to have long lengths, lengths of the first and second bellows parts can be easily increased. This further facilitates the absorption of the error in position and the vibration difference described above.

In the engine unit described above, connection ends of the respective first connection pipe and second connection pipe on a side close to the engine are located in at least a portion of regions directly underneath the first exhaust gas treatment unit and the second exhaust gas treatment unit, or at least a portion of a region directly underneath between the first exhaust gas treatment unit and the second exhaust gas treatment unit.

Thereby, the connection ends of the respective first and second connection pipes on the side close to the engine can be provided close to the first and second exhaust gas treatment units, and thus the first and second exhaust gas treatment units and the engine can be arranged in a compact manner while ensuring long lengths of the first and second connection pipes.

In the engine unit described above, connection ends of the respective first connection pipe and second connection pipe on a side close to the engine are located in at least a portion of regions directly underneath the second exhaust gas treatment device and the fourth exhaust gas treatment device, or at least a portion of a region directly underneath between the second exhaust gas treatment device and the fourth exhaust gas treatment device.

Thereby, the connection ends of the respective first and second connection pipes on the side close to the engine can be provided close to the second and fourth exhaust gas treatment devices, and thus the second and fourth exhaust gas treatment devices and the engine can be arranged in a more compact manner while ensuring long lengths of the first and second connection pipes.

In the engine unit described above, the first exhaust gas treatment device and the second exhaust gas treatment device, the second exhaust gas treatment device and the fourth exhaust gas treatment device, and the fourth exhaust gas treatment device and the third exhaust gas treatment device are each arranged separately with a gap therebetween, as seen in a plan view.

In the engine unit described above, the first exhaust gas treatment unit includes a first intermediate connection pipe connecting between the first exhaust gas treatment device and the second exhaust gas treatment device. The second exhaust gas treatment unit includes a second intermediate connection pipe connecting between the third exhaust gas treatment device and the fourth exhaust gas treatment device. The engine unit further includes a reducing agent tank, and reducing agent pipes. The reducing agent pipes connect between the reducing agent tank and the respective first intermediate connection pipe and second intermediate connection pipe. The reducing agent pipes are connected to the respective first intermediate connection pipe and second intermediate connection pipe, from the same side in the longitudinal direction.

This facilitates maintaining the temperature of a reducing agent supplied into the first and second intermediate connection pipes at an appropriate temperature, and can simplify pipe paths of the reducing agent pipes.

In the engine unit described above, each of a gap between the first exhaust gas treatment device and the second exhaust gas treatment device, a gap between the second exhaust gas treatment device and the fourth exhaust gas treatment device, and a gap between the fourth exhaust gas treatment device and the third exhaust gas treatment device is smaller than a diameter of the first intermediate connection pipe and a diameter of the second intermediate connection pipe, as seen in a plan view.

Thereby, the first to fourth exhaust gas treatment devices can be arranged closely, and thus the first to fourth exhaust gas treatment devices can be arranged in a compact manner.

In the engine unit described above, a gap between the first exhaust gas treatment device and the second exhaust gas treatment device overlaps the first intermediate connection pipe, as seen in a plan view. A gap between the third exhaust gas treatment device and the fourth exhaust gas treatment device overlaps the second intermediate connection pipe, as seen in a plan view.

Thereby, the first to fourth exhaust gas treatment devices can be arranged closely, and thus the first to fourth exhaust gas treatment devices can be arranged in a compact manner.

In the engine unit described above, the longitudinal directions of the respective first exhaust gas treatment device and third exhaust gas treatment device are parallel to each other, as seen in a plan view. A first gas inlet of the first exhaust gas treatment device to which the first connection pipe is connected and a second gas inlet of the third exhaust gas treatment device to which the second connection pipe is connected are located on a virtual plane orthogonal to both of the longitudinal directions of the respective first exhaust gas treatment device and third exhaust gas treatment device.

This facilitates connection of the first and second connection pipes to the first and third exhaust gas treatment devices, respectively, and facilitates assembling and maintenance.

In the engine unit described above, the first bellows part includes two bellows portions, and the second bellows part includes two bellows portions.

This can prevent resonance and facilitates connection of the respective first and second connection pipes.

In the engine unit described above, the second connection pipe has a portion which turns, after the second connection pipe extends in one direction, in a direction opposite to the one direction.

Since the second connection pipe has a turning portion as described above, the second connection pipe can be ensured to have a long length while being arranged under the first and second exhaust gas treatment units.

In the engine unit described above, the first exhaust gas treatment device and the second exhaust gas treatment device are arranged line-symmetrically to the third exhaust gas treatment device and the fourth exhaust gas treatment device, as seen in a plan view.

This facilitates design of the first and second exhaust gas treatment units.

In the engine unit described above, the second and fourth exhaust gas treatment devices are each a selective catalytic reduction device, and an exhaust pipe is connected to each of the second and fourth exhaust gas treatment devices.

Thereby, two exhaust pipes are adjacent to each other, which facilitates setting of a position where gas is taken into the engine. In addition, holes for the exhaust pipes are provided in an engine hood at positions close to each other, which can simplify the configuration and facilitates manufacturing.

A work vehicle in accordance with the present invention has the engine unit according to any of the above descriptions.

In the work vehicle in accordance with the present invention, connection between the engine and the first and second exhaust gas treatment units is facilitated, and a load on the connection pipes due to vibration can be reduced.

The work vehicle described above further includes a vehicular body frame, wherein the first exhaust gas treatment unit and the second exhaust gas treatment unit are supported on the vehicular body frame.

Thereby, the engine and the first and second exhaust gas treatment units can be installed or removed independently of each other, which facilitates installation and maintenance.

In the work vehicle described above, the first exhaust gas treatment unit and the second exhaust gas treatment unit are supported on the engine.

Thereby, the first and second exhaust gas treatment units and the engine can be arranged in a compact manner.

Advantageous Effects of Invention

As described above, according to the present invention, an engine unit and a work vehicle which facilitate connection between an engine and exhaust gas treatment units and can reduce a load on connection pipes due to vibration can be achieved.

BRIEF DESCRIPTION OF DRAWINGS

FIG. 2 is a partially see-through perspective view showing the vicinity of an engine compartment of the hydraulic excavator shown in FIG. 1 in an enlarged manner, with an engine and an exhaust gas treatment structure therein being seen through.

DESCRIPTION OF EMBODIMENTS

Figure 1:
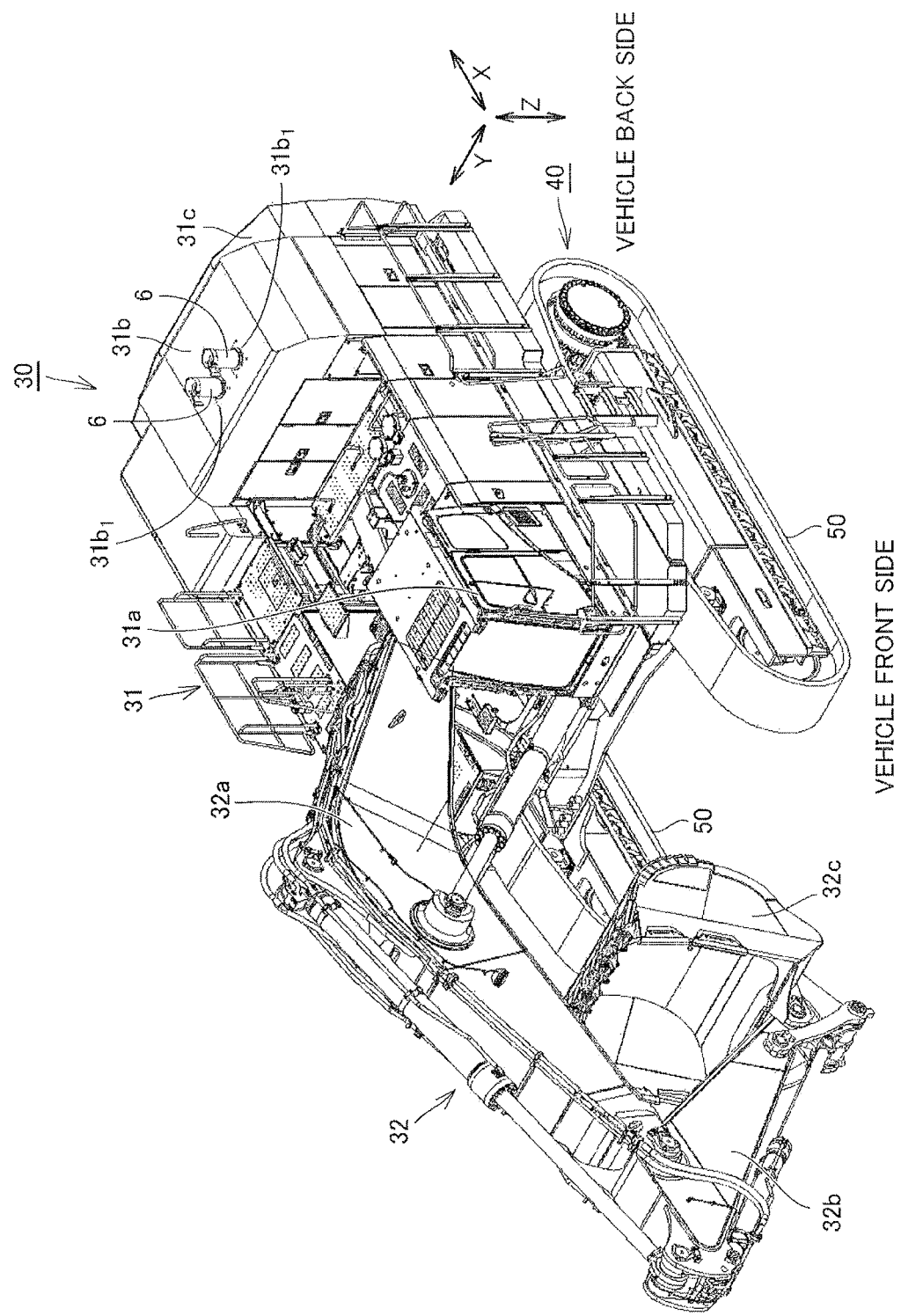
FIG. 1 is a perspective view schematically showing a configuration of a hydraulic excavator in one embodiment of the present invention.

Hereinafter, an embodiment of the present invention will be described with reference to the drawings.

First, a configuration of a hydraulic excavator as an example of a work vehicle in the embodiment of the present invention will be described with reference to FIG. 1. However, the present invention is applicable to a work vehicle equipped with an engine unit including an exhaust gas treatment unit, such as a wheel loader, a bulldozer, or the like.

In the following description of the drawings, the fore-and-aft direction means the fore-and-aft direction of a hydraulic excavator 30. In other words, the fore-and-aft direction means the fore-and-aft direction with respect to an operator sitting on an operator's seat in a cab 31a. The right-and-left direction or the lateral direction means the vehicular width direction of hydraulic excavator 30. In other words, the right-and-left direction, the vehicular width direction, or the lateral direction is the right-and-left direction with respect to the aforementioned operator. In addition, in the drawings referenced below, the fore-and-aft direction is indicated by an arrow X, the right-and-left direction is indicated by an arrow Y, and the top-and-bottom direction is indicated by an arrow Z.

FIG. 1 is a perspective view schematically showing a configuration of a hydraulic excavator in one embodiment of the present invention. Referring to FIG. 1, hydraulic excavator 30 in the present embodiment mainly has a travel base structure 40, a revolving superstructure 31, and a work implement 32. Travel base structure 40 and revolving superstructure 31 constitute a main body of the work vehicle.

Travel base structure 40 has a pair of right and left crawler belt devices 50. Each of the pair of right and left crawler belt devices 50 has a crawler belt. Hydraulic excavator 30 is configured to self-propel by rotationally driving the pair of crawler belt devices 50.

Revolving superstructure 31 is mounted revolvably with respect to travel base structure 40. Revolving superstructure 31 has cab 31a on a front left side (vehicle front side), and has an engine compartment accommodating an engine unit (an engine, an exhaust gas treatment structure, and the like) and a counterweight 31c on a back side (vehicle back side). The top of the engine compartment is covered with an engine hood 31b. Counterweight 31c is arranged at the back of the engine compartment.

Work implement 32 is pivotally supported on the front side of revolving superstructure 31, and has, for example, a boom 32a, an arm 32b, a bucket 32c, hydraulic cylinders, and the like. Boom 32a has a base end portion rotatably coupled to revolving superstructure 31. Arm 32b has a base end portion rotatably coupled to the leading end portion of boom 32a. Bucket 32c is rotatably coupled to the leading end portion of arm 32b. Work implement 32 can be driven by driving each of boom 32a, arm 32b, and bucket 32c by the hydraulic cylinder.

Next, a configuration of the engine unit (including an engine, an exhaust gas treatment structure, and connection pipes) mounted in the hydraulic excavator will be described with reference to FIGS. 2 to 9.

Figure 2:
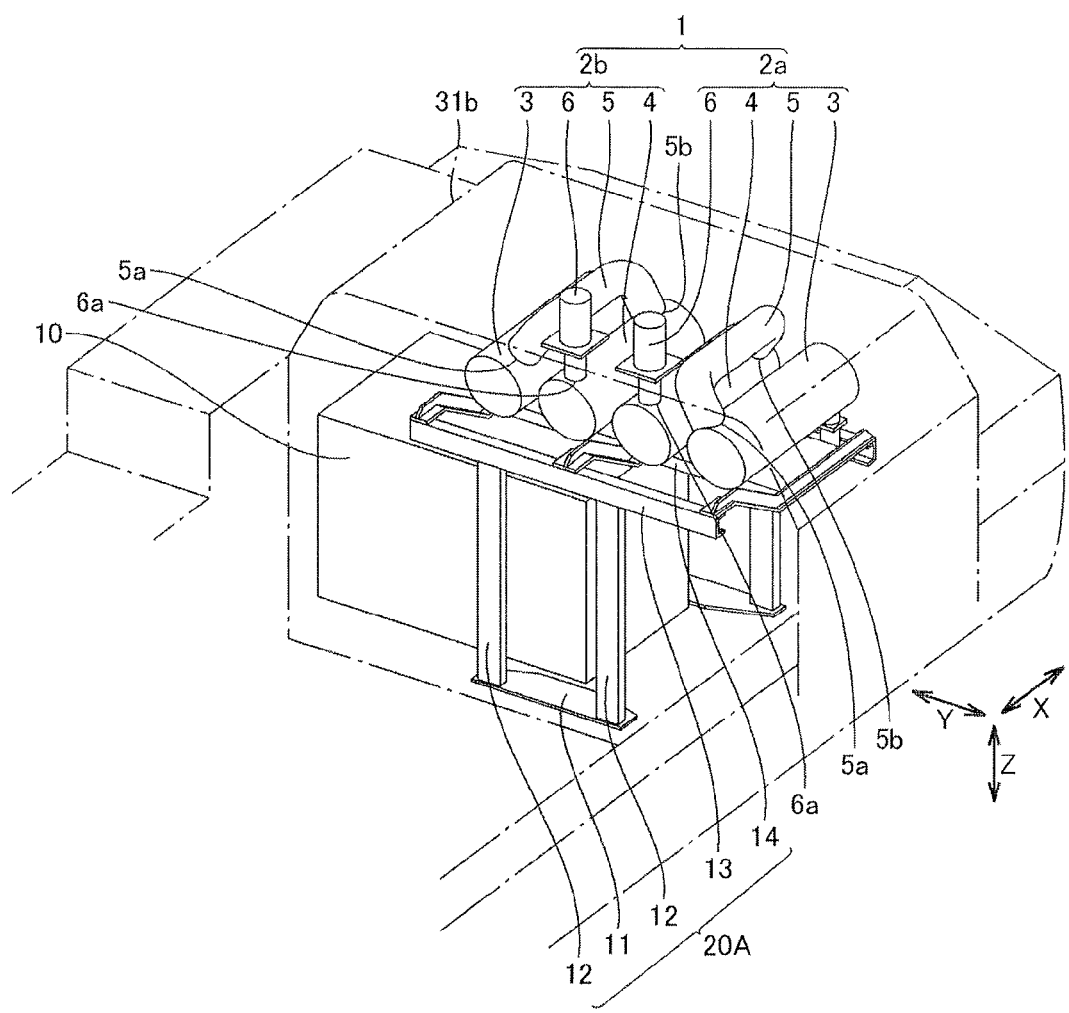

FIG. 2 is a partially see-through perspective view showing the vicinity of the engine compartment of the hydraulic excavator shown in FIG. 1 in an enlarged manner, with an engine and an exhaust gas treatment structure therein being seen through. Referring to FIG. 2, in the engine compartment, the engine unit is arranged as described above. This engine unit mainly has an engine 10, an exhaust gas treatment structure 1, a support 20A, and first and second connection pipes 7a, 7b (in FIG. 3 and the like).

Engine 10 is a large diesel engine having a displacement of for example, 20 liters or more.

Exhaust gas treatment structure 1 is arranged above engine 10. This exhaust gas treatment structure 1 has two sets of assemblies (first and second exhaust gas treatment units) 2a, 2b. Assembly 2a (first exhaust gas treatment unit) has a first exhaust gas treatment device 3, a second exhaust gas treatment device 4, a first intermediate connection pipe 5, and an exhaust pipe 6. Assembly 2b (second exhaust gas treatment unit) has a third exhaust gas treatment device 3, a fourth exhaust gas treatment device 4, a second intermediate connection pipe 5, and an exhaust pipe 6.

As the combination of first and second exhaust gas treatment devices 3, 4, an appropriate combination may be selected from a diesel particulate filter device, a diesel oxidation catalyst device, and a selective catalytic reduction device. As the combination of third and fourth exhaust gas treatment devices 3, 4 as well, an appropriate combination may be selected from a diesel particulate filter device, a diesel oxidation catalyst device, and a selective catalytic reduction device.

In the present embodiment, first and third exhaust gas treatment devices 3, 3 are each a diesel particulate filter device, for example, and second and fourth exhaust gas treatment devices 4, 4 are each a selective catalytic reduction device 4, for example. First and second intermediate connection pipes 5, 5 are each a mixing pipe, for example.

Diesel particulate filter device 3 is a device which treats exhaust gas from engine 10, and mainly has a filter (not shown) and a heater (not shown) provided in association with the filter. Diesel particulate filter device 3 is configured to collect, by means of the filter, particulate matter contained in the exhaust gas of the engine, and burn the collected particulate matter. The filter is made of ceramic, for example.

Selective catalytic reduction device 4 is a device which treats the exhaust gas from engine 10, for reducing nitrogen oxide NO through hydrolysis of a reducing agent, for example, an aqueous urea solution. In principle, selective catalytic reduction device 4 applies that ammonia ($NH_3$) chemically reacts with nitrogen oxide ($NO_x$) and is accordingly reduced to nitrogen ($N_2$) and water ($H_2O$). However, since it is dangerous to load hydraulic excavator 30 with ammonia, hydraulic excavator 30 is equipped with an aqueous urea solution tank 21 (FIG. 9) containing an aqueous urea solution for example, as a reducing agent tank. It should be noted that the reducing agent is not limited to the aqueous urea solution and may be any agent which can reduce nitrogen oxide $NO_x$.

Mixing pipe 5 connects between diesel particulate filter device 3 and selective catalytic reduction device 4 to each other. Namely, by means of mixing pipe 5, diesel particulate filter device 3 and selective catalytic reduction device 4 are connected to each other. Mixing pipe 5 is a portion for injecting, for example, an aqueous urea solution into the exhaust gas directed from diesel particulate filter device 3 toward selective catalytic reduction device 4 and mixing urea with the exhaust gas.

Exhaust pipe 6 is connected to selective catalytic reduction device 4, for emitting the exhaust gas which has passed through diesel particulate filter device 3 and selective catalytic reduction device 4 into the atmosphere. Exhaust pipe 6 protrudes upward through engine hood 31b.

The two sets of assemblies 2a, 2b are arranged such that diesel particulate filter device 3 of assembly 2a, selective catalytic reduction device 4 of assembly 2a, selective catalytic reduction device 4 of assembly 2b, and diesel particulate filter device 3 of assembly 2b are located next to each other in this order, as seen in a plan view.

The two sets of assemblies 2a, 2b are supported by support 20A to be located above engine 10. Support 20A is provided to support exhaust gas treatment structure 1, and has plate boards 11 placed on a vehicular body frame, vertical frames 12, a lateral frame 13, sub brackets 14, and small brackets (not shown). Details of the configuration of support 20A will be described later.

Figure 3:
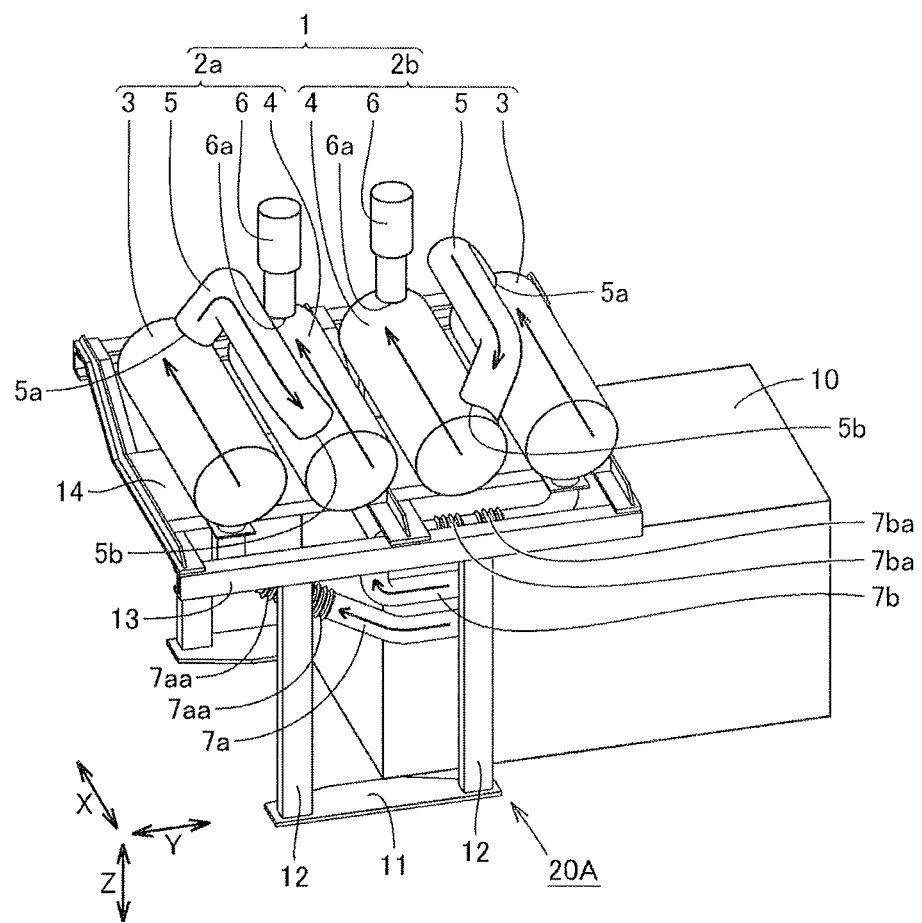
FIG. 3 is a schematic perspective view showing the engine and the exhaust gas treatment structure of the hydraulic excavator shown in FIG. 1, from diagonally backward.

FIG. 3 is a schematic perspective view showing the engine and the exhaust gas treatment structure of the hydraulic excavator shown in FIG. 1, from diagonally backward. Referring to FIG. 3, in the engine unit of the present embodiment, exhaust gas treatment structure 1 and engine 10 are connected to each other by first and second connection pipes 7a, 7b.

Namely, first connection pipe 7a guides the exhaust gas from engine 10 to diesel particulate filter device 3 of assembly 2a. Second connection pipe 7b guides the exhaust gas from engine 10 to diesel particulate filter device 3 of assembly 2b.

First and second connection pipes 7a, 7b are bellows expansion pipe joints having expandable bellows parts 7aa, 7ba, respectively. For the sake of thermal resistance and corrosion resistance, first and second connection pipes 7a, 7b are each made of a steel material such as stainless steel, for example.

First connection pipe 7a is provided with two bellows portions 7aa, 7aa, for example, as bellows part 7aa. Second connection pipe 7b is provided with two bellows portions 7ba, 7ba, for example, as bellows part 7ba. However, the number of bellows portions 7aa, 7ba provided in first and second connection pipes 7a, 7b, respectively, is not limited thereto, and may be one or three or more. In addition, the number of bellows portions 7aa provided in first connection pipes 7a may not be identical to, that is, may be different from, the number of bellows portions 7ba provided in second connection pipe 7b.

Figure 4:
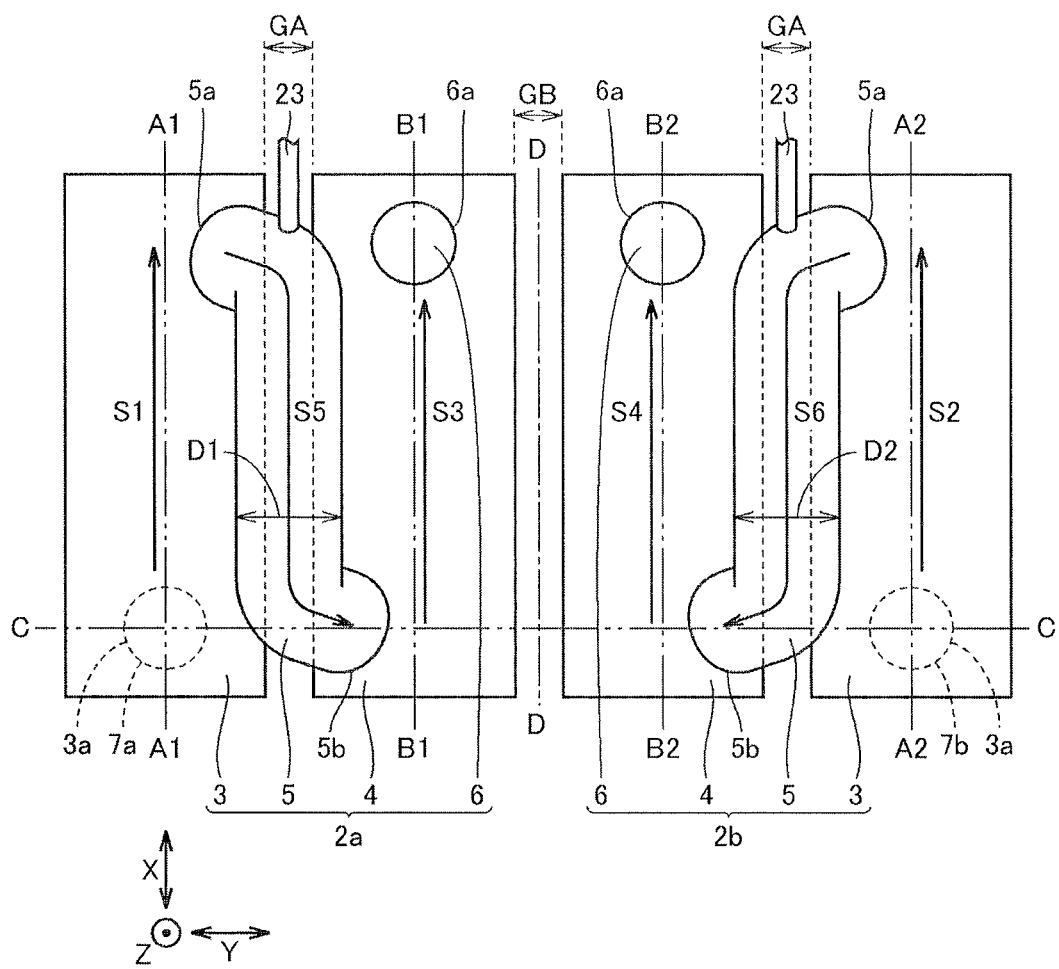
FIG. 4 is a plan view schematically showing a configuration of the exhaust gas treatment structure shown in FIG. 3, from above.

FIG. 4 is a plan view schematically showing a configuration of the exhaust gas treatment structure shown in FIG. 3, from above. Referring to FIG. 4, diesel particulate filter device 3 of each of assemblies 2a, 2b has a substantially cylindrical contour. Selective catalytic reduction device 4 of each of assemblies 2a, 2b has a substantially cylindrical contour.

Constituent devices 3, 4, which are two diesel particulate filter devices 3 and two selective catalytic reduction devices 4, extend longer in the direction of central axis lines A1, A2, B1, B2 of the cylindrical shapes than in the radial direction. Thus, the longitudinal direction of each of constituent devices 3, 4 corresponds to the direction of each of the aforementioned central axis lines A1, A2, B1, B2.

Constituent devices 3, 4 are arranged such that respective longitudinal directions thereof extend (run) next to each other as seen in a plan view. Namely, constituent devices 3, 4 are arranged such that respective central axis lines A1, A2, B1, B2 thereof extend (run) next to each other. As long as respective central axis lines A1, A2, B1, B2 of constituent devices 3, 4 extend (run) next to each other, they may or may not be parallel with each other.

Two diesel particulate filter devices 3 have respective one ends in longitudinal directions A1, A2 that are provided with gas inlets 3a to which first and second connection pipes 7a, 7b are connected, respectively. Two diesel particulate filter devices 3 have respective other ends in longitudinal directions A1, A2 that are provided with gas outlets 5a to which mixing pipes 5 are connected, respectively. Thus, two diesel particulate filter devices 3 are configured such that exhaust gas moves therein through paths, as indicated by arrows S1, S2, in longitudinal directions A1, A2 of diesel particulate filter devices 3, respectively.

Two selective catalytic reduction devices 4 have respective one ends in their longitudinal directions that are provided with gas inlets 5b to which mixing pipes 5 are connected, respectively. Two selective catalytic reduction devices 4 have respective other ends in longitudinal directions B1, B2 that are provided with gas outlets 6a to which exhaust pipes 6 are connected, respectively. Thus, two selective catalytic reduction devices 4 are configured such that exhaust gas moves therein through paths, as indicated by arrows S3, S4, in longitudinal directions B1, B2 of selective catalytic reduction devices 4, respectively. The direction in which exhaust gas moves in selective catalytic reduction device 4 is the same as the direction in which exhaust gas moves in diesel particulate filter device 3.

In addition, two mixing pipes 5 are configured such that exhaust gas moves therein through paths, as indicated by arrows S5, S6, in the longitudinal directions of mixing pipes 5, respectively. The direction in which exhaust gas moves in mixing pipe 5 is opposite to the direction in which exhaust gas moves in each of diesel particulate filter device 3 and selective catalytic reduction device 4.

Two diesel particulate filter devices 3 and two selective catalytic reduction devices 4 are located next to each other along a direction which crosses (for example, which is orthogonal to) longitudinal directions A1, A2, B1, B2. More specifically, respective longitudinal directions A1, A2, B1, B2 of two diesel particulate filter devices 3 and two selective catalytic reduction devices 4 extend in the fore-and-aft direction (X direction) of hydraulic excavator 30, and two diesel particulate filter devices 3 and two selective catalytic reduction devices 4 are located next to each other along the right-and-left direction (Y direction) of hydraulic excavator 30.

Regarding an exhaust path in exhaust gas treatment structure 1, exhaust gas moves from one end side to the other end side in longitudinal direction A1 of diesel particulate filter device 3. Then, the exhaust gas turns in the opposite direction through mixing pipe 5 and reaches one end side in longitudinal direction B1 of selective catalytic reduction device 4. Thereafter, the exhaust gas turns again in the opposite direction in selective catalytic reduction device 4 to move from one end side to the other end side in longitudinal direction B1 of selective catalytic reduction device 4, and is emitted from exhaust pipe 6. Thus, the exhaust path is for example in the S shape as seen in a plan view.

Respective gas inlets 3a of two diesel particulate filter devices 3 are arranged on the same side (lower side as seen in the drawing) in longitudinal directions A1, A2. When respective longitudinal directions A1, A2 of two diesel particulate filter devices 3 are parallel to each other as seen in a plan view, respective gas inlets 3a of two diesel particulate filter devices 3 are located on a virtual plane C orthogonal to both longitudinal directions A1, A2.

As seen in a plan view, diesel particulate filter device 3 and selective catalytic reduction device 4 of assembly 2a are arranged line-symmetrically to diesel particulate filter device 3 and selective catalytic reduction device 4 of assembly 2b with respect to a virtual line D extending in the longitudinal direction between two selective catalytic reduction devices 4.

A gap GA between diesel particulate filter device 3 and selective catalytic reduction device 4 in assembly 2a and a gap GB between selective catalytic reduction devices 4 are smaller than diameters D1, D2 of two respective mixing pipes 5. A gap GA between diesel particulate filter device 3 and selective catalytic reduction device 4 in assembly 2b and gap GB between selective catalytic reduction devices 4 are smaller than diameters D1, D2 of two respective mixing pipes 5.

In addition, as seen in a plan view, respective gaps GA between diesel particulate filter device 3 and selective catalytic reduction device 4 in assemblies 2a, 2b also overlap respective mixing pipes 5 in assemblies 2a, 2b.

Figure 5:
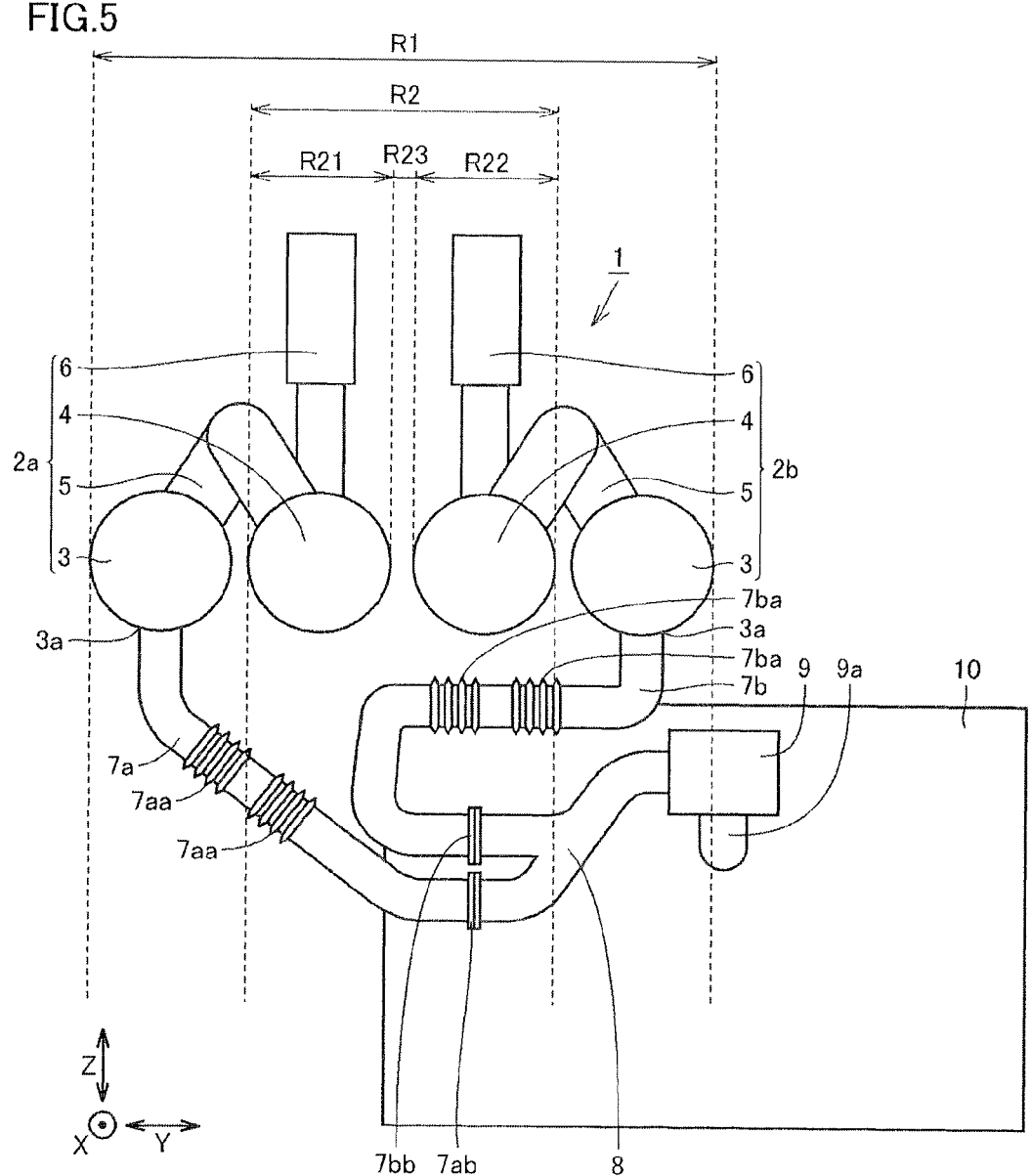
FIG. 5 is a back view schematically showing the engine, the exhaust gas treatment structure, and connection pipes shown in FIG. 3, from backward.

FIG. 5 is a back view (rear view) schematically showing the engine, the exhaust gas treatment structure, and the connection pipes shown in FIG. 3, from the vehicle back side (rear side). Referring to FIG. 5, first connection pipe 7a has one end 7ab connected to an exhaust port 9a of engine 10 with a branch pipe 8 and a supercharger 9 interposed therebetween. First connection pipe 7a has the other end connected to gas inlet 3a of diesel particulate filter device 3 in assembly 2a.

The other end of first connection pipe 7a may be connected directly to gas inlet 3a of diesel particulate filter device 3 in assembly 2a without another pipe interposed therebetween, or connected indirectly thereto with another pipe interposed therebetween. In addition, one end 7ab of first connection pipe 7a may be connected to exhaust port 9a of engine 10 without supercharger 9 interposed therebetween.

First connection pipe 7a has a laterally extending portion extending in the Y direction from one end 1ab, a tilt portion extending from the laterally extending portion at a predetermined tilt angle with respect to the Y direction, and a vertically extending portion extending in the Z direction from the tilt portion to be connected to diesel particulate filter device 3. Bellows part 7aa is provided in the tilt portion.

Second connection pipe 7b has one end 7bb connected to exhaust port 9a of engine 10 with branch pipe 8 and supercharger 9 interposed therebetween. Second connection pipe 7b has the other end connected to gas inlet 3a of diesel particulate filter device 3 in assembly 2b.

The other end of second connection pipe 7b may be connected directly to gas inlet 3a of diesel particulate filter device 3 in assembly 2b without another pipe interposed therebetween, or connected indirectly thereto with another pipe interposed therebetween. In addition, one end 7bb of second connection pipe 7b may be connected to exhaust port 9a of engine 10 without supercharger 9 interposed therebetween.

Second connection pipe 7b has a first laterally extending portion extending in the Y direction from one end 7bb, a first vertically extending portion extending in the Z direction from the first laterally extending portion, a second laterally extending portion extending in the Y direction from the first vertically extending portion to guide exhaust gas in a direction opposite to the first laterally extending portion, and a second vertically extending portion extending in the Z direction from the second laterally extending portion to be connected to diesel particulate filter device 3. Namely, second connection pipe 7b has the second laterally extending portion which turns, after second connection pipe 7b extends to one side in the Y direction in the first laterally extending portion, in a direction opposite to the one side. Bellows part 7ba is provided in the second laterally extending portion.

At least a portion of assembly 2b is arranged at a position overlapping engine 10 as seen in a plan view. Diesel particulate filter device 3, selective catalytic reduction device 4, mixing pipe 5, and exhaust pipe 6 of assembly 2b are arranged at the position overlapping engine 10 as seen in a plan view, and arranged in a region directly above engine 10.

On the other hand, assembly 2a is arranged at a position not overlapping engine 10 as seen in a plan view. Diesel particulate filter device 3, selective catalytic reduction device 4, mixing pipe 5, and exhaust pipe 6 of assembly 2a are arranged at the position not overlapping engine 10 as seen in a plan view, and arranged to be away from the region directly above engine 10.

First connection pipe 7a is routed through a region directly underneath an arrangement region R2 in the drawing, and connected to diesel particulate filter device 3 of assembly 2a. Second connection pipe 7b is routed through the region directly underneath arrangement region R2 in the drawing, and connected to diesel particulate filter device 3 of assembly 2b.

Here, arrangement region R2 is a region including regions R21, R22 where selective catalytic reduction devices 4, 4 of assembly 2a, 2b are arranged, respectively, and a region R23 between selective catalytic reduction device 4 of assembly 2a and selective catalytic reduction device 4 of assembly 2b.

In addition, the region directly underneath arrangement region R2 is a region located in a direction (Z direction) orthogonal to a plane constituted by a direction in which two selective catalytic reduction devices 4, 4 face each other (for example, the Y direction) and longitudinal directions B1, B2 of two selective catalytic reductions devices 4, 4 (for example, the X direction), with respect to arrangement region R2.

Namely, both of first and second connection pipes 7a, 7b are routed through at least a partial region of a region directly underneath selective catalytic reduction device 4 of assembly 2a and a region directly underneath selective catalytic reduction device 4 of assembly 2b.

Ends 7ab, 7bb (connection ends on a side close to the engine) of respective first and second connection pipes 7a, 7b are preferably located in a region R1 directly underneath exhaust gas treatment structure 1, and more preferably located in the region directly underneath arrangement region R2.

Namely, ends 7ab, 7bb of the respective first and second connection pipes are preferably located in at least a portion of a region directly underneath assembly 2a and a region directly underneath assembly 2b, or at least a portion of region R23 directly underneath between assembly 2a and assembly 2b. In addition, ends 7ab, 7bb of the respective first and second connection pipes are more preferably located in at least a portion of regions R21, R22 directly underneath selective catalytic reduction device 4 of assembly 2a and selective catalytic reduction device 4 of assembly 2b, respectively, or at least a portion of region R23 directly underneath between selective catalytic reduction device 4 of assembly 2a and selective catalytic reduction device 4 of assembly 2b.

Next, a structure supporting the engine and the exhaust gas treatment structure will be described with reference to FIGS. 6 to 8.

Figure 6:
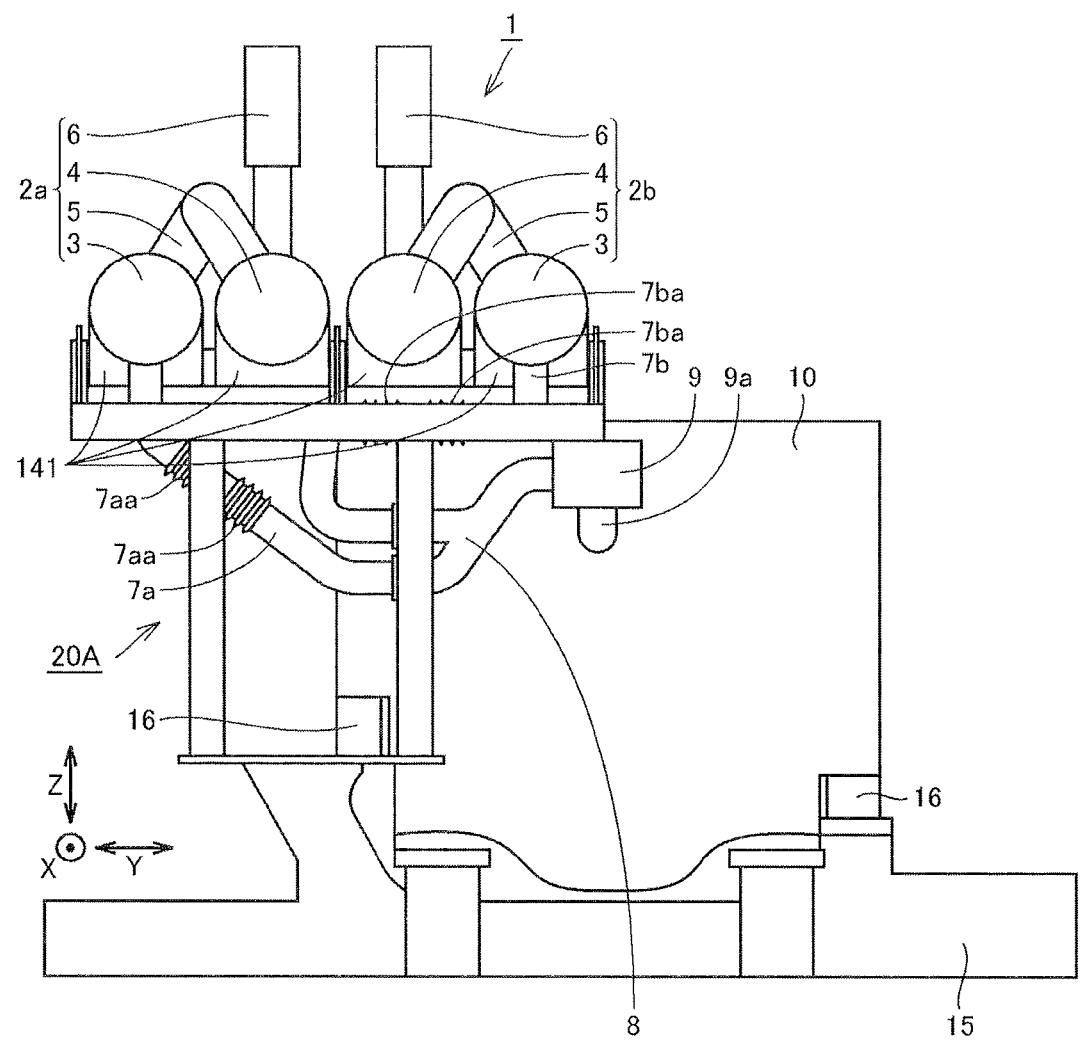
FIG. 6 is a back view (rear view) schematically showing a configuration in which the engine and the exhaust gas treatment structure are supported on a frame independently of each other, from backward (a rear side).
Figure 7:
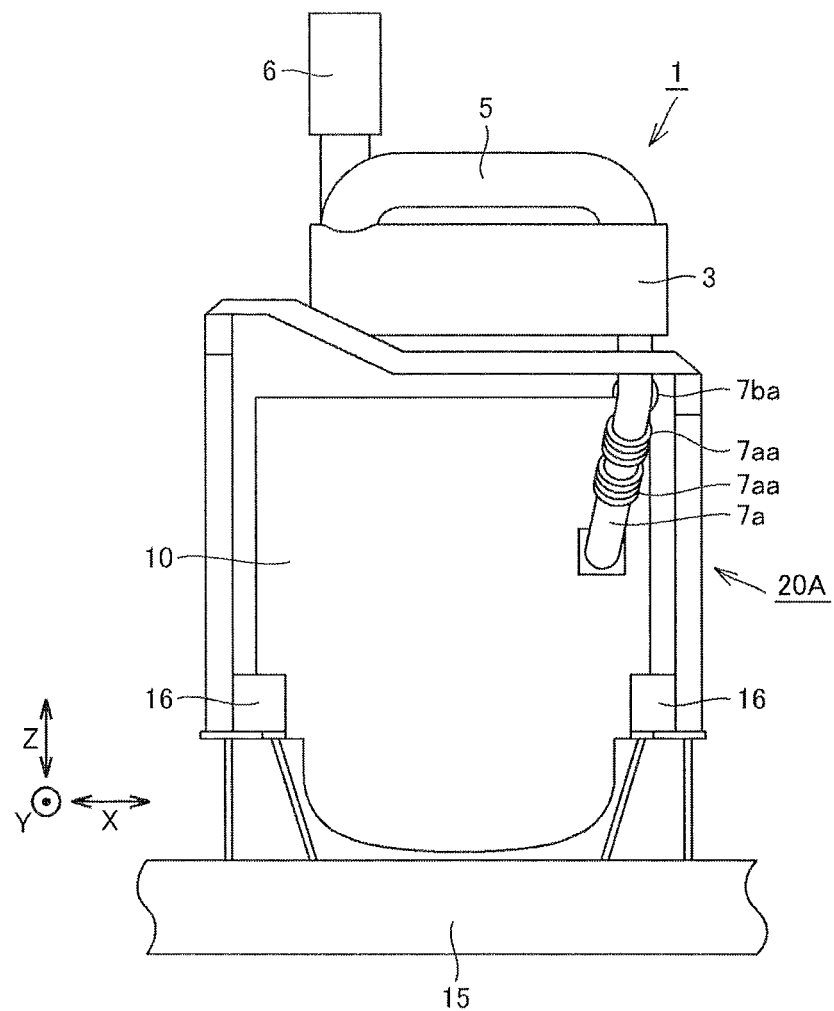
FIG. 7 is a side view schematically showing the configuration in which the exhaust gas treatment structure and the engine are supported on the frame independently of each other, from a side.

FIGS. 6 and 7 are a back view and a side view schematically showing a configuration in which the engine and the exhaust gas treatment structure are supported on a frame independently of each other, from backward and from a side, respectively. Referring to FIGS. 6 and 7, in the present embodiment, engine 10 and exhaust gas treatment structure 1 are supported on a vehicular body frame 15 independently of each other.

Specifically, engine 10 is supported on vehicular body frame 15 with rubber dampers 16 interposed therebetween. Rubber dampers 16 suppress vibration of engine 10 from being transmitted to vehicular body frame 15. Exhaust gas treatment structure 1 is supported on vehicular body frame 15 by support 20A.

Figure 8:
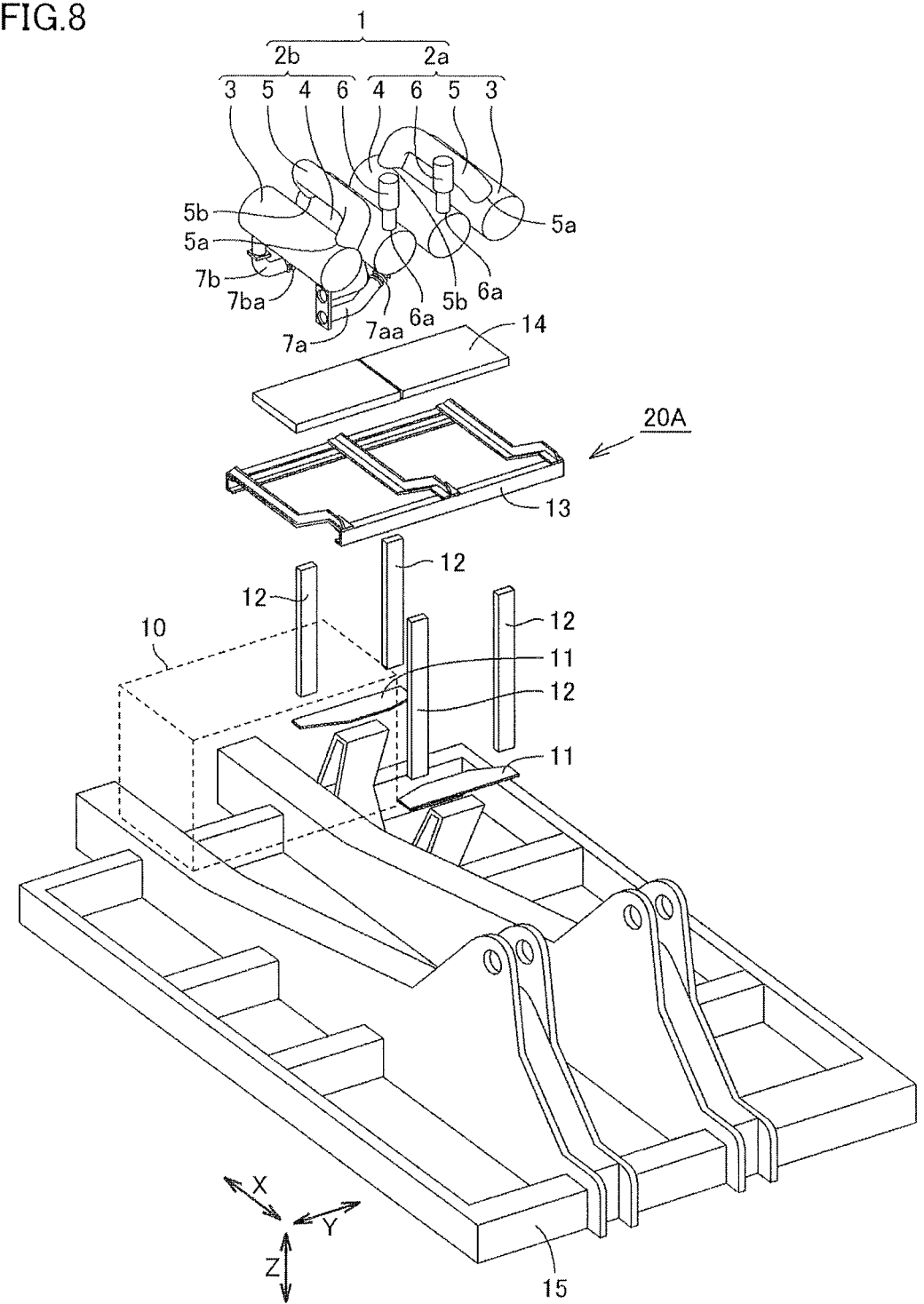
FIG. 8 is an exploded perspective view showing a configuration of a support for supporting the exhaust gas treatment structure on the frame, in an exploded manner.

FIG. 8 is an exploded perspective view showing a configuration of the support for supporting the exhaust gas treatment structure on the frame, in an exploded manner. Referring to FIG. 8, support 20A has two plate boards 11, four vertical frames (pillar members) 12, a lateral frame 13, two sub brackets 14, and a plurality of small brackets 141 (FIG. 6), as shown in FIG. 8.

Each of two plate boards 11 has a flat plate shape, and is attached to vehicular body frame 15. Each of four vertical frames 12 has a pillar shape, and is attached to plate board 11. Each of four vertical frames 12 extends upward of engine 10 from the position where it is attached to plate board 11.

Lateral frame 13 is attached to vertical frames 12, and has two frame portions separated for example in the Y direction. One of the two frame portions of lateral frame 13 is a portion for supporting diesel particulate filter device 3 and selective catalytic reduction device 4 of assembly 2a, and the other of the two frame portions of lateral frame 13 is a portion for supporting diesel particulate filter device 3 and selective catalytic reduction device 4 of assembly 2b.

Each of two sub brackets 14 has a flat plate shape. One of two sub brackets 14 is attached to one of the two frame portions of lateral frame 13, and the other of two sub brackets 14 is attached to the other of the two frame portions of lateral frame 13.

The plurality of small brackets 141 include two brackets supporting diesel particulate filter device 3 of assembly 2a, two brackets supporting selective catalytic reduction device 4 of assembly 2a, two brackets supporting diesel particulate filter device 3 of assembly 2b, and two brackets supporting selective catalytic reduction device 4 of assembly 2b.

The brackets supporting diesel particulate filter device 3 of assembly 2a and the brackets supporting selective catalytic reduction device 4 of assembly 2a are attached to one of two sub brackets 14. The brackets supporting diesel particulate filter device 3 of assembly 2b and the brackets supporting selective catalytic reduction device 4 of assembly 2b are attached to the other of two sub brackets 14.

By rubber dampers 16 and support 20A as described above, engine 10 and exhaust gas treatment structure 1 are supported on vehicular body frame 15 independently of each other. Rubber dampers 16 may be attached to plate boards 11 of support 20A, or may be attached to vehicular body frame 15.

Next, a configuration for feeding urea to the selective catalytic reduction devices of the exhaust gas treatment structure will be described with reference to FIGS. 4 and 9.

Figure 9:
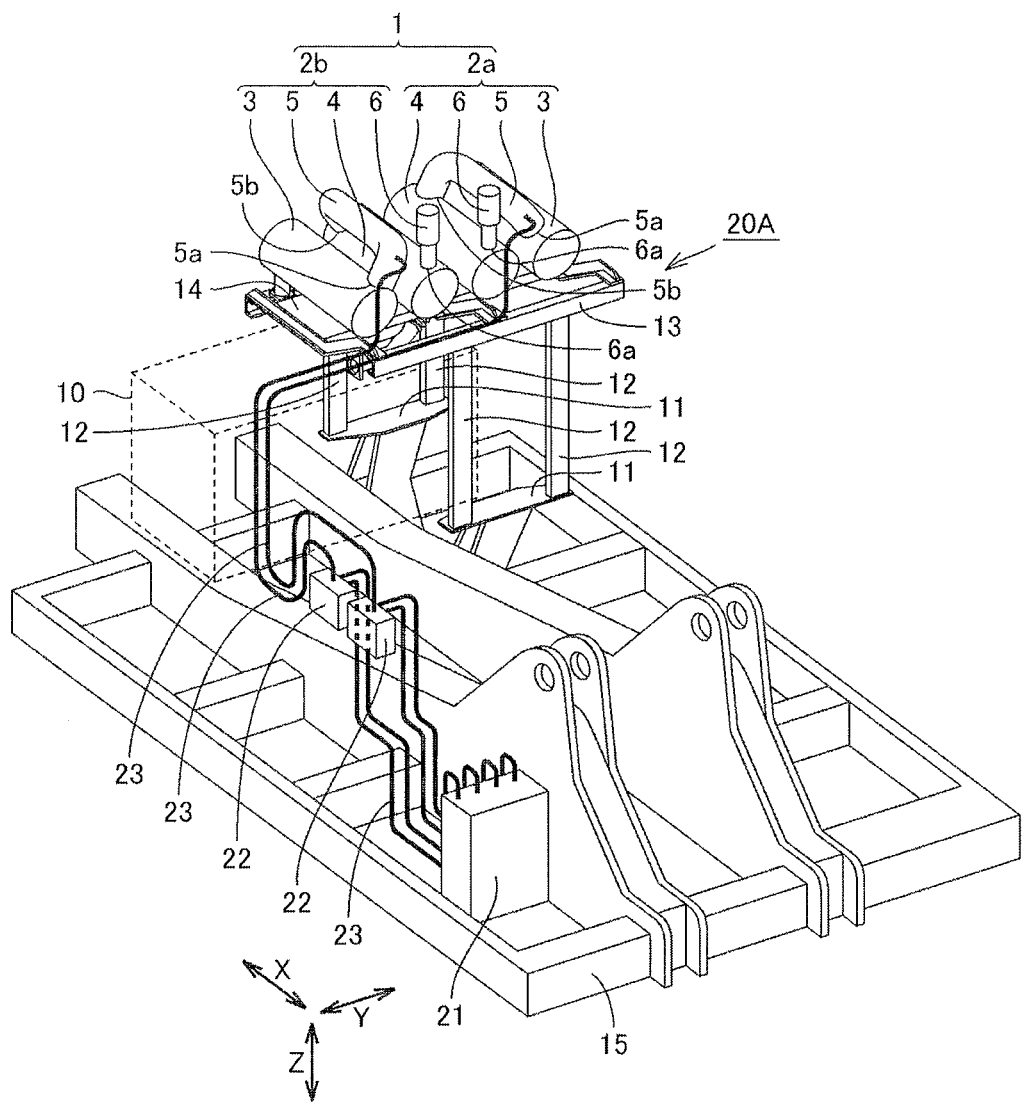
FIG. 9 is a schematic perspective view showing a configuration in which mixing pipes of the exhaust gas treatment structure and an aqueous urea solution tank are connected by aqueous urea solution pipes.

FIG. 9 is a schematic perspective view showing a configuration in which the mixing pipes of the exhaust gas treatment structure and an aqueous urea solution tank (reducing agent tank) are connected by aqueous urea solution pipes (reducing agent pipes). Referring to FIG. 9, selective catalytic reduction device 4 is configured to selectively reduce nitrogen oxide $NO_x$ through hydrolysis of, for example, an aqueous urea solution. A device is therefore necessary that feeds urea to selective catalytic reduction device 4.

This urea feeding device mainly has aqueous urea solution tank 21, a pump 22, and aqueous urea solution pipes 23.

Aqueous urea solution tank 21 is configured to be able to store the aqueous urea solution. Aqueous urea solution tank 21 is arranged, for example, outside the engine compartment, and is supported on vehicular body frame 15.

Aqueous urea solution pipes 23 connect aqueous urea solution tank 21 and mixing pipes 5 to each other. By means of aqueous urea solution pipes 23, the aqueous urea solution stored in aqueous urea solution tank 21 can be guided into two respective mixing pipes 5.

Pump 22 is arranged at a certain location along paths of aqueous urea solution pipes 23. Pump 22 performs a function of pumping the aqueous urea solution from aqueous urea solution tank 21 through aqueous urea solution pipes 23 to two respective mixing pipes 5.

By driving pump 22 of the urea feeding device described above, the aqueous urea solution stored in aqueous urea solution tank 21 is fed through aqueous urea solution pipes 23 and injected into two respective mixing pipes 5.

Further, in the urea feeding device described above, aqueous urea solution pipes 23 are connected to two respective mixing pipes 5, from the same side (front side in the drawing) in the longitudinal direction (X direction), as shown in FIG. 4. Portions where aqueous urea solution pipes 23 are connected to mixing pipes 5 are located upstream of the exhaust paths in mixing pipes 5. Accordingly, the aqueous urea solution fed and injected into mixing pipes 5 can be mixed uniformly with exhaust gas while flowing from upstream to downstream in mixing pipes 5.

Figure 10:
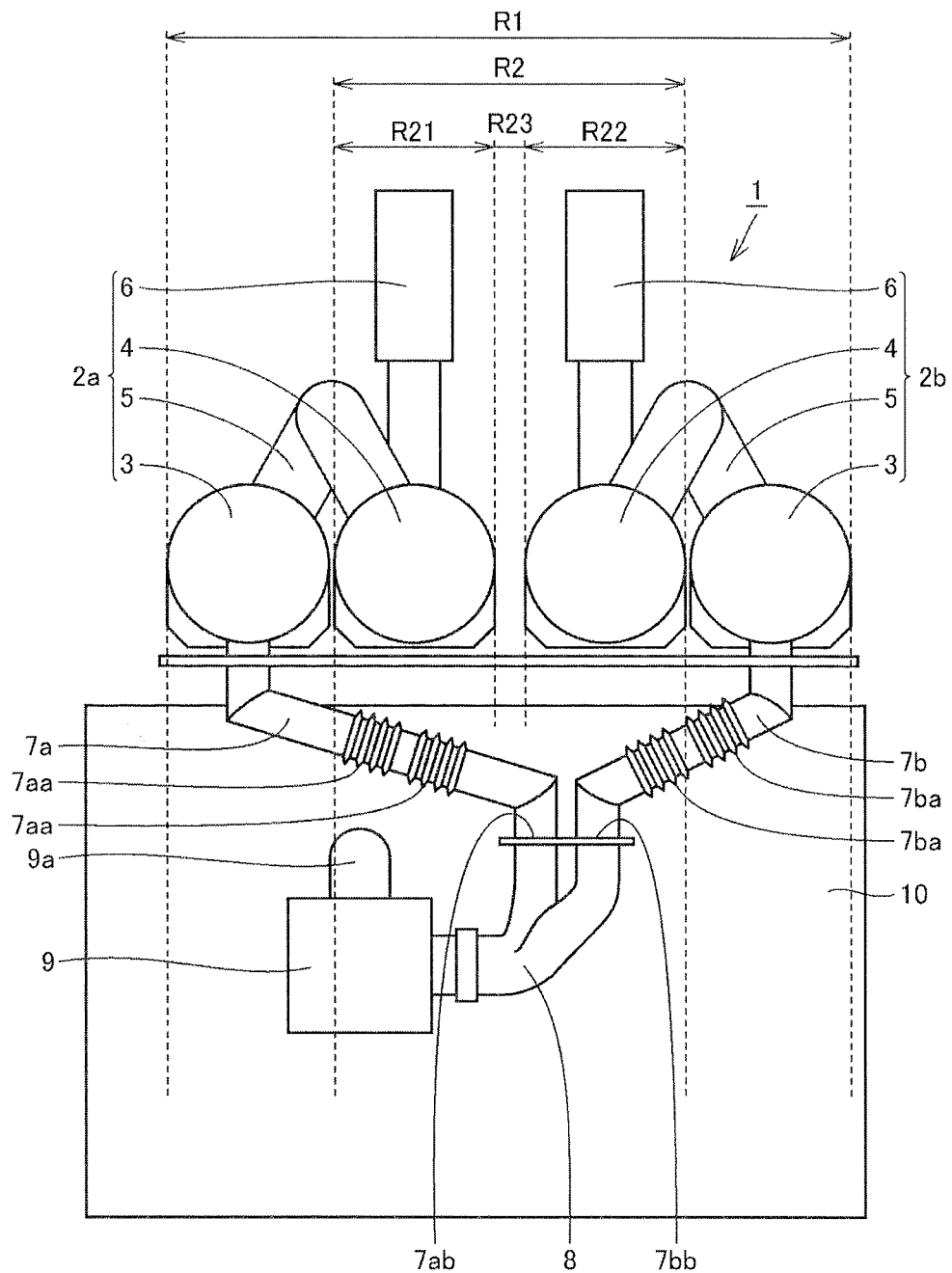
FIG. 10 is a back view schematically showing a configuration of a variation of the connection pipes.

Although the configuration in which exhaust gas treatment structure 1 is arranged to be partially misaligned from the region directly above engine 10 as shown in FIG. 5 has been described above, exhaust gas treatment structure 1 may be entirely arranged in the region directly above engine 10 as shown in FIG. 10.

Also in the configuration as shown in FIG. 10, two sets of assemblies 2a, 2b are arranged such that diesel particulate filter device 3 of assembly 2a as a first set, selective catalytic reduction device 4 of assembly 2a as the first set, selective catalytic reduction device 4 of assembly 2b as a second set, and diesel particulate filter device 3 of assembly 2b as the second set are located next to each other in this order.

Further, respective first and second connection pipes 7a, 7b are routed through the region directly underneath arrangement region R2 where two selective catalytic reduction devices 4 and the like are arranged, and connected to respective diesel particulate filter devices 3.

Other than that, the configuration shown in FIG. 10 is substantially identical to the configurations shown in FIGS. 1 to 9. Accordingly, identical elements will be designated by the same reference numerals, and the description thereof will not be repeated.

Figure 11:
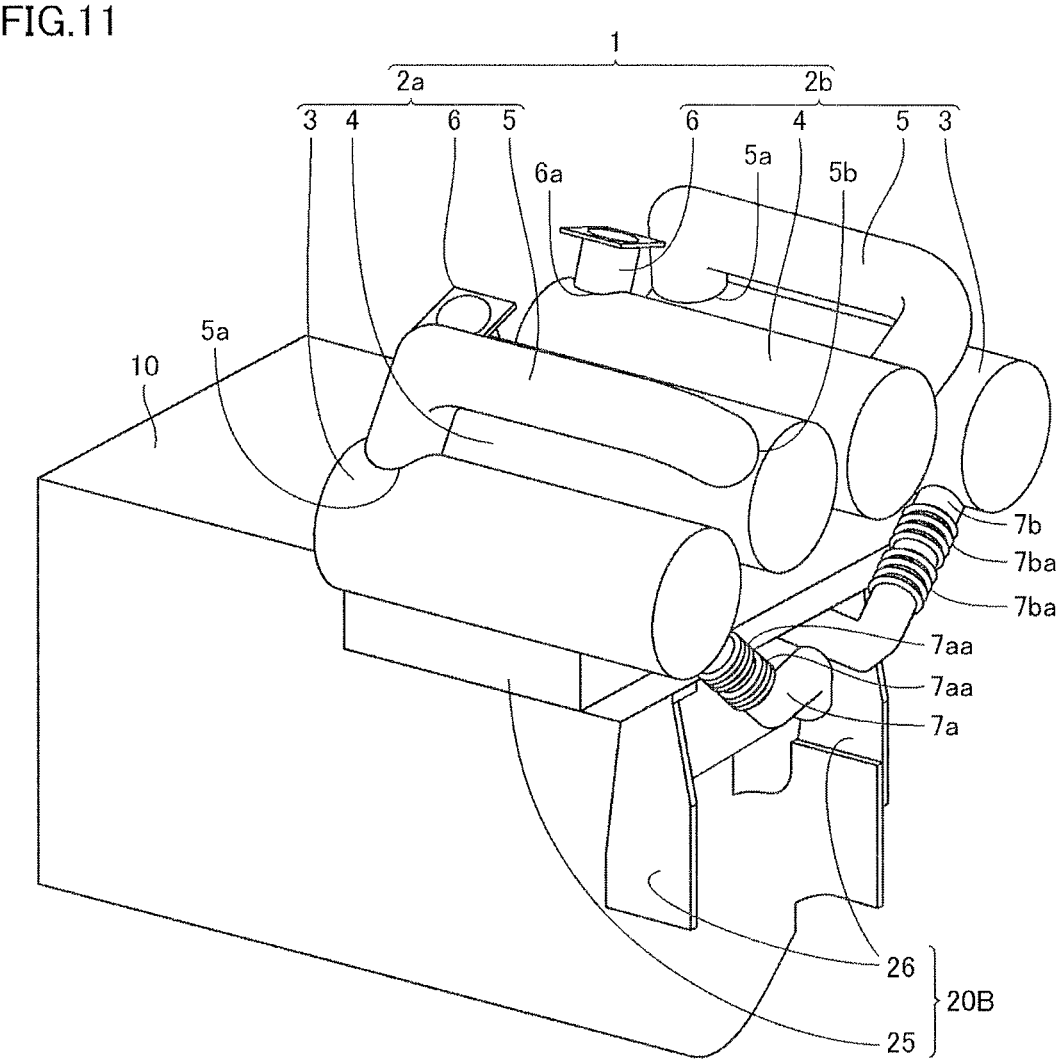
FIG. 11 is a perspective view schematically showing a configuration in which the exhaust gas treatment structure is supported on the engine.

In addition, although the configuration in which exhaust gas treatment structure 1 and engine 10 are supported on vehicular body frame 15 independently of each other as shown in FIGS. 6 to 8 has been described above, exhaust gas treatment structure 1 may be supported on engine 10 with a support 20B interposed therebetween as shown in FIG. 11. Support 20B in this configuration has, for example, a support table 25 for supporting exhaust gas treatment structure 1 on engine 10, and connection portions 26 for connecting support table 25 to engine 10. Connection portions 26 are joined to engine 10 with, for example, bolts or the like.

Also in the configuration as shown in FIG. 11, two sets of assemblies 2a, 2b are arranged such that diesel particulate filter device 3 of assembly 2a as a first set, selective catalytic reduction device 4 of assembly 2a as the first set, selective catalytic reduction device 4 of assembly 2b as a second set, and diesel particulate filter device 3 of assembly 2b as the second set are located next to each other in this order.

Further, respective first and second connection pipes 7a, 7b are routed through a region directly underneath an arrangement region where two selective catalytic reduction devices 4 are arranged, and connected to respective diesel particulate filter devices 3.

Other than that, the configuration shown in FIG. 11 is substantially identical to the configurations shown in FIGS. 1 to 9. Accordingly, identical elements will be designated by the same reference numerals, and the description thereof will not be repeated.

Next, the functions and effects of the present embodiment will be described.

According to the present embodiment, since two assemblies 2a, 2b are provided as exhaust gas treatment structure 1, exhaust gas treatment capability can be improved, and a sufficient exhaust gas treatment capability can be obtained even for a work vehicle equipped with large engine 10.

Further, as shown in FIG. 5, respective first and second connection pipes 7a, 7b are routed through the region directly underneath arrangement region R2 where two selective catalytic reduction devices 4 and the like are arranged, and connected to respective diesel particulate filter devices 3. By routing first and second connection pipes 7a, 7b as described above, first and second connection pipes 7a, 7b can be ensured to have long lengths while being arranged under exhaust gas treatment structure 1. Thus, even when there occurs an error in the positions of engine 10 and exhaust gas treatment structure 1 caused by an error in processing and assembling support 20A supporting exhaust gas treatment structure 1, and deflection of support 20A due to the weight of exhaust gas treatment structure 1, the above error can be absorbed by the lengths of first and second connection pipes 7a, 7b and expandable bellows parts 7aa, 7ba. Therefore, also in the configuration provided with two assemblies 2a, 2b, connection between engine 10 and exhaust gas treatment structure 1 is facilitated.

Further, since first and second connection pipes 7a, 7b can be ensured to have long lengths, a vibration difference between the vibration of vehicular body frame 15 and the vibration of engine 10 can be absorbed by the lengths of first and second connection pipes 7a, 7b and expandable bellows parts 7aa, 7ba. Therefore, also in the configuration provided with two assemblies 2a, 2b, a load due to the above vibration difference can be suppressed from acting on first and second connection pipes 7a, 7b.

Further, since first and second connection pipes 7a, 7b can be ensured to have long lengths, lengths of bellows parts 7aa, 7ba can be easily increased. This further facilitates the absorption of the error in position and the vibration difference described above.

Further, as shown in FIG. 5, connection ends 7ab, 7bb of respective first and second connection pipes 7a, 7b on the side close to engine 10 are located in region R1 directly underneath exhaust gas treatment structure 1. Namely, connection ends 7ab, 7bb are located in any of the region directly underneath assembly 2a, the region directly underneath assembly 2b, and the region directly underneath region R23 between assembly 2a and assembly 2b. Thereby, connection ends 7ab, 7bb of respective first and second connection pipes 7a, 7b on the side close to engine 10 can be provided close to exhaust gas treatment structure 1, and thus exhaust gas treatment structure 1 and engine 10 can be arranged in a compact manner while ensuring long lengths of first and second connection pipes 7a, 7b.

Further, as shown in FIG. 5, connection ends 7ab, 7bb of respective first and second connection pipes 7a, 7b on the side close to engine 10 are located in the region directly underneath arrangement region R2 where two selective catalytic reduction devices 4 and the like are arranged. Namely, connection ends 7ab, 7bb are located in any of the region directly underneath selective catalytic reduction device 4 of assembly 2a, the region directly underneath selective catalytic reduction device 4 of assembly 2b, and the region directly underneath region R23 between selective catalytic reduction device 4 of assembly 2a and selective catalytic reduction device 4 of assembly 2b. Thereby, connection ends 7ab, 7bb of respective first and second connection pipes 7a, 7b on the side close to engine 10 can be provided close to selective catalytic reduction devices 4, and thus exhaust gas treatment structure 1 and engine 10 can be arranged in a more compact manner while ensuring long lengths of first and second connection pipes 7a, 7b.

Further, as shown in FIGS. 6 and 7, engine 10 and exhaust gas treatment structure 1 are supported on vehicular body frame 15 independently of each other. Thereby, engine 10 and exhaust gas treatment structure 1 can be installed or removed independently of each other, which facilitates installation and maintenance.

Further, when exhaust gas treatment structure 1 is supported on engine 10 as shown in FIG. 11, exhaust gas treatment structure 1 and engine 10 can be arranged in a compact manner.

Further, when respective longitudinal directions A1, A2 of two diesel particulate filter devices 3 are parallel to each other as seen in a plan view as shown in FIG. 4, respective gas inlets 3a of two diesel particulate filter devices 3 are located on virtual plane C orthogonal to both longitudinal directions A1, A2. This facilitates connection of first and second connection pipes 7a, 7b to respective diesel particulate filter devices 3, and facilitates assembling and maintenance.

Further, as seen in a plan view shown in FIG. 4, diesel particulate filter device 3 and selective catalytic reduction device 4 of assembly 2a are arranged line-symmetrically to diesel particulate filter device 3 and selective catalytic reduction device 4 of assembly 2b with respect to virtual line D extending in the longitudinal direction between two selective catalytic reduction devices 4. This facilitates design of exhaust gas treatment structure 1.

Further, as shown in FIGS. 4 and 9, aqueous urea solution pipes 23 are connected to two respective mixing pipes 5, from the same side (upper side in the drawing) in the longitudinal direction. This facilitates maintaining the temperature of the aqueous urea solution supplied into mixing pipes 5 at an appropriate temperature, which will be described below.

Referring to FIG. 9, appropriate temperature control is required for the aqueous urea solution stored in aqueous urea solution tank 21. Specifically, aqueous urea solution tank 21 is preferably arranged to be away from a high-temperature environment, because ammonia tends to be generated from the aqueous urea solution in aqueous urea solution tank 21 when the temperature inside aqueous urea solution tank 21 exceeds 50 to 60° C. Since the temperature inside the engine compartment is relatively high due to heat generation of engine 10 and the like, it is preferable to arrange aqueous urea solution tank 21 to be away from the engine compartment, and minimize path lengths of aqueous urea solution pipes 23 passing through the engine compartment when aqueous urea solution pipes 23 extend from aqueous urea solution tank 21 to reach mixing pipes 5.

Here, in the present embodiment, aqueous urea solution tank 21 is arranged outside the engine compartment. Aqueous urea solution pipes 23 are connected to two respective mixing pipes 5, from the same side in the longitudinal direction. Further, the portions where aqueous urea solution pipes 23 are connected to mixing pipes 5 are located on the same side as the side on which aqueous urea solution tank 21 is arranged, with respect to the engine compartment. This can decrease the path lengths of aqueous urea solution pipes 23 passing through the engine compartment. Therefore, the aqueous urea solution flowing through aqueous urea solution pipes 23 is less likely to be influenced by the heat inside the engine compartment, which facilitates maintaining the temperature of the aqueous urea solution supplied into mixing pipes 5 at an appropriate temperature.

Further, since aqueous urea solution pipes 23 are connected to two respective mixing pipes 5 from the same side (upper side in the drawing) in the longitudinal direction, pipe paths of aqueous urea solution pipes 23 can be simplified.

Further, as shown in FIG. 4, aqueous urea solution pipes 23 are connected to upstream end portions of the exhaust paths in mixing pipes 5. Accordingly, the aqueous urea solution fed and injected into mixing pipes 5 can be dispersed uniformly into exhaust gas while flowing from the upstream end portions to downstream end portions in mixing pipes 5.

Further, as also shown in FIG. 4, each of gap GA between diesel particulate filter device 3 and selective catalytic reduction device 4 in each of assemblies 2a, 2b and gap GB between selective catalytic reduction devices 4 is smaller than diameters D1, D2 of two respective mixing pipes 5. Thereby, constituent devices 3, 4 of exhaust gas treatment structure 1 can be arranged closely in the Y direction, and thus exhaust gas treatment structure 1 can be arranged in a compact manner.

Further, as seen in a plan view shown in FIG. 4, a clearance between diesel particulate filter device 3 and selective catalytic reduction device 4 of assembly 2a overlaps mixing pipe 5. Furthermore, as seen in a plan view shown in FIG. 4, a clearance between diesel particulate filter device 3 and selective catalytic reduction device 4 of assembly 2b overlaps mixing pipe 5. Thereby, constituent devices 3, 4 of exhaust gas treatment structure 1 can be arranged closely in the Y direction, and thus exhaust gas treatment structure 1 can be arranged in a compact manner.

Further, as shown in FIG. 5, bellows part 7aa includes two bellows portions, and bellows part 7ba also includes two bellows portions. This can prevent resonance and facilitates connection of respective first and second connection pipes 7a, 7b.

Further, as shown in FIG. 5, second connection pipe 7b has a portion which turns, after second connection pipe 7b extends to one direction in the Y direction from connection end lab on the side close to engine 10, in a direction opposite to the one direction. Since second connection pipe 7b has a turning portion as described above, second connection pipe 7b can be ensured to have a long length while being arranged under exhaust gas treatment structure 1.

Further, since two selective catalytic reduction devices 4, 4 are adjacent to each other as shown in FIG. 5, exhaust pipes 6, 6 respectively connected to two selective catalytic reduction devices 4, 4 are also adjacent to each other. This facilitates setting of a position where gas is taken into engine 10. In addition, holes $31b_1$, $31b_1$ for the two exhaust pipes are provided in engine hood (exterior component) 31b at positions close to each other as shown in FIG. 1, which can simplify the configuration and facilitates manufacturing.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: exhaust gas treatment structure; 2a, 2b: assembly; 3: diesel particulate filter device; 3a, 5b: gas inlet; 4: selective catalytic reduction device; 5: mixing pipe; 5a, 6a: gas outlet; 6: exhaust pipe; 7a: first connection pipe; 7b: second connection pipe; 7aa, 7ba: bellows part; 7ab: connection end; 8: branch pipe; 9: supercharger; 9a: exhaust port; 10: engine; 11: plate board; 12: vertical frame; 13: lateral frame; 14: sub bracket; 15: vehicular body frame; 16: rubber damper; 20A, 20B: support; 21: aqueous urea solution tank; 22: pump; 23: aqueous urea solution pipe; 25: support table; 26: connection portion; 30: hydraulic excavator; 31: revolving superstructure; 31a: cab; 31b: engine hood; $31b_1$: hole for exhaust pipe; 31c: counterweight; 32: work implement; 32a: boom; 32b: arm; 32c: bucket; 40: travel base structure; 50: crawler belt device.

The invention claimed is:
1. An engine unit, comprising:
an engine;
a first exhaust gas treatment unit arranged above said engine and including a first exhaust gas treatment device and a second exhaust gas treatment device;
a second exhaust gas treatment unit arranged above said engine and including a third exhaust gas treatment device and a fourth exhaust gas treatment device;

a first connection pipe having an expandable first bellows part and guiding exhaust gas from said engine to said first exhaust gas treatment device of said first exhaust gas treatment unit;

a second connection pipe having an expandable second bellows part and guiding the exhaust gas from said engine to said third exhaust gas treatment device of said second exhaust gas treatment unit; and a branch pipe dividing the exhaust gas from said engine, said first connection pipe connecting said branch pipe to said first exhaust gas treatment device and said second connection pipe connecting said branch pipe to said third exhaust gas treatment device, wherein said first to fourth exhaust gas treatment devices are arranged to be located in an order of said first exhaust gas treatment device, said second exhaust gas treatment device, said fourth exhaust gas treatment device, and said third exhaust gas treatment device, such that respective longitudinal directions thereof extend next to each other, said first connection pipe is routed through at least a partial region of a region directly underneath said second exhaust gas treatment device and a region directly underneath said fourth exhaust gas treatment device, said second connection pipe is routed through at least a partial region of the region directly underneath said second exhaust gas treatment device and the region directly underneath said fourth exhaust gas treatment device, and said branch pipe is disposed in at least a portion of regions directly underneath said second exhaust gas treatment device and said fourth exhaust gas treatment device.

2. The engine unit according to claim 1, wherein connection ends of respective said first connection pipe and said second connection pipe on a side close to said engine are located in at least a portion of regions directly underneath said first exhaust gas treatment unit and said second exhaust gas treatment unit, or at least a portion of a region directly underneath between said first exhaust gas treatment unit and said second exhaust gas treatment unit.

3. The engine unit according to claim 1, wherein connection ends of respective said first connection pipe and said second connection pipe on a side close to said engine are located in at least the portion of regions directly underneath said second exhaust gas treatment device and said fourth exhaust gas treatment device, or at least a portion of a region directly underneath between said second exhaust gas treatment device and said fourth exhaust gas treatment device.

4. The engine unit according to claim 1, wherein said first exhaust gas treatment device and said second exhaust gas treatment device, said second exhaust gas treatment device and said fourth exhaust gas treatment device, and said fourth exhaust gas treatment device and said third exhaust gas treatment device are each arranged separately with a gap therebetween, as seen in a plan view.

5. The engine unit according to claim 1, wherein said first exhaust gas treatment unit includes a first intermediate connection pipe connecting between said first exhaust gas treatment device and said second exhaust gas treatment device, said second exhaust gas treatment unit includes a second intermediate connection pipe connecting between said third exhaust gas treatment device and said fourth exhaust gas treatment device, said engine unit further comprises:
a reducing agent tank; and
reducing agent pipes connecting between said reducing agent tank and respective said first intermediate connection pipe and said second intermediate connection pipe, and said reducing agent pipes are connected to respective said first intermediate connection pipe and said second intermediate connection pipe, from the same side in said longitudinal direction.

6. The engine unit according to claim 5, wherein each of a gap between said first exhaust gas treatment device and said second exhaust gas treatment device, a gap between said second exhaust gas treatment device and said fourth exhaust gas treatment device, and a gap between said fourth exhaust gas treatment device and said third exhaust gas treatment device is smaller than a diameter of said first intermediate connection pipe and a diameter of said second intermediate connection pipe, as seen in a plan view.

7. The engine unit according to claim 5, wherein a gap between said first exhaust gas treatment device and said second exhaust gas treatment device overlaps said first intermediate connection pipe, as seen in a plan view, and a gap between said third exhaust gas treatment device and said fourth exhaust gas treatment device overlaps said second intermediate connection pipe, as seen in a plan view.

8. The engine unit according to claim 1, wherein said longitudinal directions of respective said first exhaust gas treatment device and said third exhaust gas treatment device are parallel to each other, as seen in a plan view, and a first gas inlet of said first exhaust gas treatment device to which said first connection pipe is connected and a second gas inlet of said third exhaust gas treatment device to which said second connection pipe is connected are located on a virtual plane orthogonal to both of said longitudinal directions of respective said first exhaust gas treatment device and said third exhaust gas treatment device.

9. The engine unit according to claim 1, wherein said first bellows part includes two bellows portions, and said second bellows part includes two bellows portions.

10. The engine unit according to claim 1, wherein said second connection pipe has a portion which turns, after said second connection pipe extends in one direction, in a direction opposite to said one direction.

11. The engine unit according to claim 1, wherein said first exhaust gas treatment device and said second exhaust gas treatment device are arranged line-symmetrically to said third exhaust gas treatment device and said fourth exhaust gas treatment device, as seen in a plan view.

12. A work vehicle having said engine unit according to claim 1.

13. The work vehicle according to claim 12, further comprising a vehicular body frame, wherein said first exhaust gas treatment unit
and said second exhaust gas treatment unit are supported on said vehicular body frame.

14. The work vehicle according to claim 12, wherein said first exhaust gas treatment unit and said second exhaust gas treatment unit are supported on said engine.

* * * * *